2,917,061
SERVO OPERATED TEMPERATURE COMPENSATED VALVE

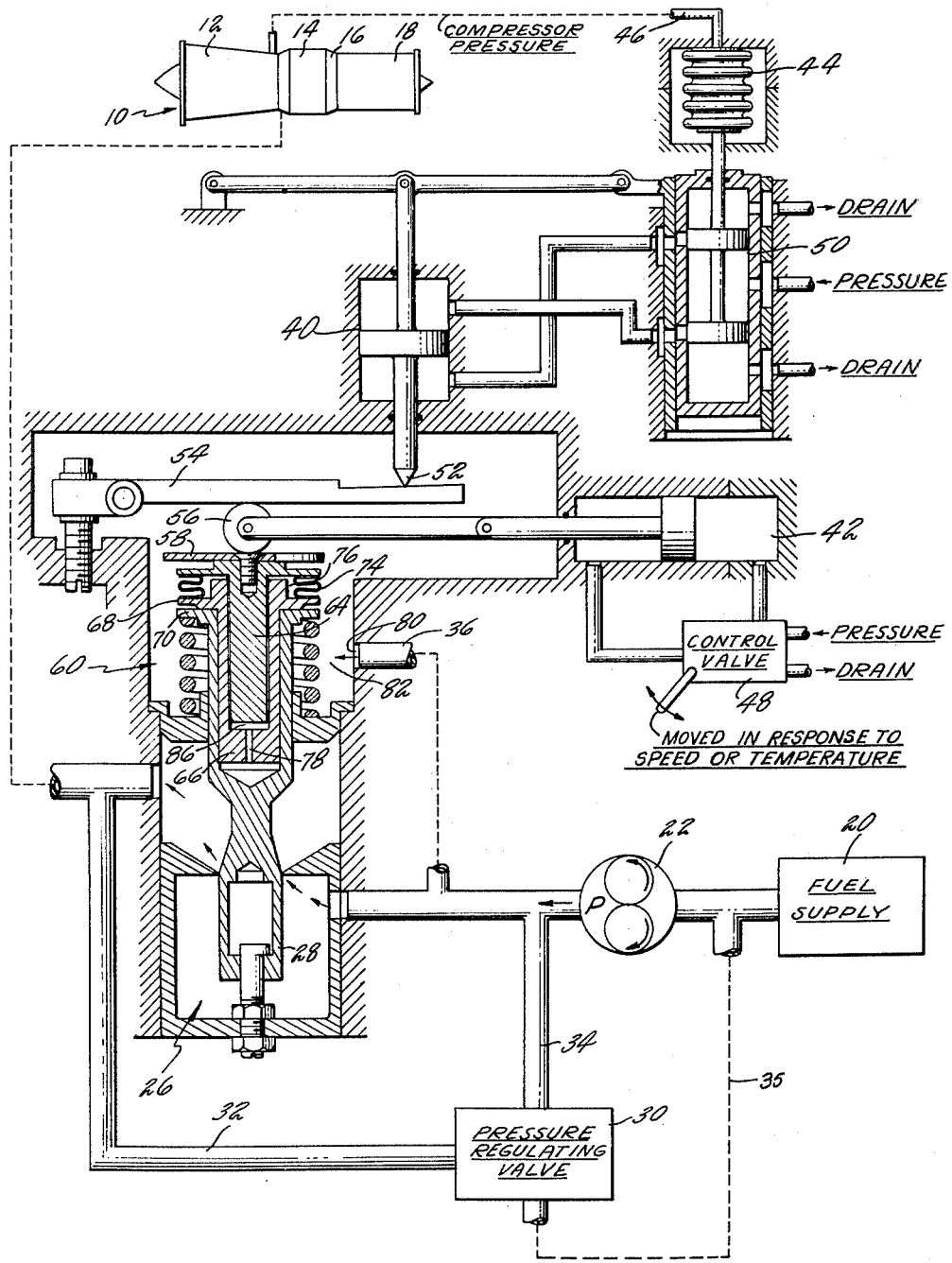

Melvin E. Longfellow, Manchester, Conn., assignor to United Aircraft Corporation, East Hartford, Conn., a corporation of Delaware Application March 4, 1955, Serial No. 492,250

3 Claims. (Cl. 137—51)

This invention relates to flow regulating devices and more specifically to fuel flow regulating mechanisms.

In flow regulating devices as for example in fuel controls for turbine power plants, the various parts are subject to temperature changes over a wide range. Where parts are made of different materials with different temperature coefficients, as for example the throttle valve, a differential expansion or contraction may occur in these parts which will cause an error in fuel flow. Also changes in fuel density occur and changes in the characteristics of other control elements such as springs, and metal bellows, may introduce errors in fuel flow. These variations can be calculated for cumulative error and then compensated for over a temperature range in a compromise manner.

It is therefore an object of this invention to provide a flow regulating device including means for compensating for error in fluid flow over a temperature range.

It is a further object of this invention to provide a throttle valve for a fuel control device including temperature compensating means for adjusting throttle valve opening in accordance with variations in temperature.

These and other objects of this invention will become readily apparent from the following detailed description of the drawing which is a partially schematic and partially detailed cross-section illustrating the particular valve and regulating system of this invention.

Referring to the drawing, a turbine type engine is generally indicated at 10 and includes a compressor section 12, a combustion section 14, a turbine section 16 and an exhaust nozzle 18. Fuel is supplied to the engine from a source 20 from which fuel is withdrawn by a suitable pump 22. A fuel flow to the engine is regulated by means of a throttle valve generally indicated at 26 which includes a movable element 28. In order that a predetermined amount of flow past the valve is obtained for any given position of the movable element 28 the pressure drop across the valve is regulated by a pressure regulator 30. The regulator 30 senses the pressure on the downstream side of the valve via a line 32 and the pressure on the upstream side of the valve via a line 34. The regulator is also connected to a drain line 35.

Motion is imparted to the movable valve element 28 by means of servo-motors 40 and 42. The servo-motor 40 is controlled by a pilot valve 50 which in turn is moved by the movable end of a bellows 44. The inside of the bellows 44 is exposed to the discharge pressure from the compressor 12 by means of a line 46. It will therefore be apparent that the servo-motor 40 assumes a position which is proportional to the position of pilot valve 50 and also is positioned in proportion to compressor discharge pressure.

The servo-motor 42 may be controlled by a suitable control valve 48 which in turn can be moved in response to one or more parameters of power plant operation such as speed or inlet air temperature by any suitable mechanism. The particular mechanism may for example be similar to the valve 50 or similar to the servo mechanisms shown in Gosslau et al. Patent No. 2,297,213.

The servo-motor 40 includes a knife-edge 52 which engages the end of a pivoted lever 54. The servo-motor 42 includes a roller 56 which engages the lever 54 and the upper portion 58 of the throttle valve. The lever 54 and the roller 56 are so arranged that the motion of each of the servo-motors 40 and 42 is multiplied through the linkage.

The general system thus far described is similar to that disclosed in copending application Serial No. 244,551, filed August 31, 1951 by Stanley G. Best and which matured into Patent No. 2,822,666.

In order to compensate for variations in temperature of the fuel and the errors induced by other elements which are affected by temperature a temperature compensating device generally indicated at 60 is provided. The temperature compensating mechanism primarily provides a variable length connection between the upper portion 58 of the throttle valve and the lower movable element 28 thereof. Fixed to the upper element 58 is a depending piston 64 which has a loose fit in a cooperating cylinder 66. The cylinder 66 includes a flange 68 which is engaged by a flange 70 fixed to and movable with the throttle valve element 28.

A bellows 74 is sealably connected to both the flange 68 and the upper valve portion 58 thereby forming a chamber or reservoir 76. This reservoir is filled during assembly of the valve by means of a filler opening 78 with a suitable liquid which has the necessary properties for expansion and contraction with variations in temperature. Fuel at pump pressure is conducted from the line 36 to a port 80 and into the chamber 82 which surrounds the bellows 74. It will thus be seen, for example, that as the temperature of the fuel increases the fluid in the reservoir 76 will tend to expand thereby creating a downward force on the flange 68 tending to move the flange 68 and the flange 70 and the throttle valve element 28 downwardly or in an increased opening position. Also since the piston 64 fits loosely in the cylinder 66 fluid under the increased pressure will flow down to the chamber 86 where it can act on the lower surface of the piston 64 thereby tending to move the piston and cylinder apart. As the temperature of the fuel decreases the reverse action will ensue. The loose fit of piston 64 forms a fluid connection between reservoir 76 and variable volume chamber 86.

With the bellows and cylinder-piston arrangement just described the adverse vibratory effects on the throttle valve are minimized while still providing free up-and-down movement. Secondly, the cylinder-piston arrangement acts as a guide and assures errorless linear motion. It is apparent that if the bellows did not have this guide it would tend to rotate or tilt the platen or upper portion 58 when the roller 56 is eccentric with respect to the platen 58.

It is thus apparent that, as a result of this invention, variations in temperature and hence the density of the fuel in a fuel regulating system, or any other fluid regulating system, can be readily compensated for to ensure accurate flow control over a wide range of conditions.

Although only one embodiment of this invention has been illustrated and described herein, it will be apparent that various changes and modifications may be made in the construction and arrangement of the various parts without departing from this novel concept.

What it is desired by Letters Patent is:

1. In a flow regulating device, a source of fluid, a valve receiving fluid from said source, a movable valve member for controlling the flow of fluid through said valve, mechanism for moving said member, a piston-cylinder combination interconnecting said member and said mechanism and forming a variable volume chamber, a bellows forming a reservoir of fluid, means placing the reservoir in heat exchange relation with the fluid from said source, said bellows being coaxially disposed with respect to said piston-cylinder combination, and means forming a fluid conducting connection between said reservoir and said chamber.

2. In a fluid flow regulating device, a source of fluid, a valve receiving fluid from said source, a movable valve member for controlling the flow of fluid through said valve, means for moving said movable member, telescoping mechanism interconnecting said member and said means for moving said member, a bellows forming a fluid reservoir, means placing the reservoir in heat exchange relation with the fluid being regulated, said bellows being coaxially disposed with respect to said telescoping mechanism, and means forming a fluid conducting connection between said reservoir and said telescoping mechanism whereby the relative position of said member and said means for moving said member may be varied in response to variations in temperature of the fluid being regulated.

3. In a fluid flow regulating device, a source of fluid, a valve receiving fluid from said source, a movable valve member for controlling the flow of fluid through said valve, means for moving said movable member, telescoping mechanism interconnecting said member and said means for moving said member, said telescoping mechanism comprising a cylinder and piston having an active end, a bellows forming a fluid reservoir, means placing the reservoir in heat exchange relation with the fluid being regulated, said bellows being coaxially disposed with respect to said cylinder and piston, and said cylinder and piston having a relatively loose fit thereby forming a fluid connection between said reservoir and the active end of said piston whereby the relative position of said member and said means for moving said member may be varied in response to variations in temperature of the fluid being regulated.

References Cited in the file of this patent

UNITED STATES PATENTS

| | | |
|---|---|---|
| 842,250 | Sandvoss | Jan. 29, 1907 |
| 1,663,566 | Royer | Mar. 27, 1928 |
| 1,920,752 | Kissing et al. | Aug. 1, 1933 |
| 2,154,030 | Brumbaugh | Apr. 11, 1939 |
| 2,187,120 | Gosslau et al. | Jan. 16, 1940 |
| 2,395,007 | Leupold | Feb. 19, 1946 |
| 2,396,138 | Vernet | Mar. 5, 1946 |
| 2,484,109 | Meinecke | Oct. 11, 1949 |
| 2,564,127 | Orr | Aug. 14, 1951 |
| 2,570,098 | Carlstedt | Oct. 2, 1951 |
| 2,621,672 | Jacobs | Dec. 16, 1952 |